United States Patent
Yahia

[11] Patent Number: 6,138,041
[45] Date of Patent: Oct. 24, 2000

[54] DEVICE FOR SAFE USE OF A PORTABLE CELLULAR TELEPHONE WHILE DRIVING

[75] Inventor: Karim Ben Yahia, Miami, Fla.

[73] Assignee: CCM Cellular Connection of Miami, Inc., Miami, Fla.

[21] Appl. No.: 09/159,807

[22] Filed: Sep. 23, 1998

[51] Int. Cl.[7] ..................................... H04Q 7/32

[52] U.S. Cl. .......................... 455/569; 455/573; 455/550; 455/575; 455/90; 455/346; 455/347; 455/345; 455/348; 379/446; 379/445; 379/433; 379/428

[58] Field of Search ................................. 455/569, 573, 455/550, 575, 90, 346, 347, 572, 345, 348, 350, 351; 379/446, 445, 433, 428

[56] References Cited

U.S. PATENT DOCUMENTS

| | | | |
|---|---|---|---|
| 5,282,246 | 1/1994 | Yang ........................................ | 455/569 |
| 5,392,350 | 2/1995 | Swanson ................................. | 379/446 |
| 5,414,770 | 5/1995 | Wang ...................................... | 379/446 |
| 5,444,867 | 8/1995 | Maraui et al. .......................... | 455/569 |
| 5,471,530 | 11/1995 | Chen ..................................... | 455/569 |
| 5,490,213 | 2/1996 | Huang .................................... | 455/569 |
| 5,613,222 | 3/1997 | Guenther ................................ | 455/569 |
| 5,642,402 | 6/1997 | Vilmi et al. ............................ | 455/569 |
| 5,687,234 | 11/1997 | Chang ................................... | 379/446 |
| 5,779,205 | 7/1998 | Ching .................................... | 455/569 |
| 5,797,088 | 8/1998 | Stamegna ............................... | 455/569 |
| 5,839,919 | 11/1998 | Chen ..................................... | 379/446 |

OTHER PUBLICATIONS

Herrington, Fall '98 Catalog, #M294 "Plug–In Flip Phone Holder", p. 44.

Primary Examiner—Fan Tsang
Assistant Examiner—Keith Ferguson
Attorney, Agent, or Firm—Akerman, Senterfitt & Eidson, P.C.; Peter J. Manso

[57] ABSTRACT

A cordless apparatus for permitting the hands-free use of a cellular telephone while driving a vehicle. The device comprises a main body including a speaker, a microphone, a supporting member and a securing means for securing the telephone to the main body. The main body comprises a head and a base, wherein the telephone cradle is substantially centrally located within the main body, between the head and the base. The telephone cradle has a top receiving end and a bottom receiving end, comprising a charging unit located substantially adjacent to the bottom receiving end of the telephone cradle. The speaker is positioned on the head of the main body substantially adjacent to the top end of the telephone cradle, and the microphone is located on the base of the main body, substantially adjacent to the receiving end of the telephone cradle. The supporting member comprises a first end affixed to the main body and a second end comprising a cigarette lighter adapter. The adapter is for plugging into a cigarette lighter of the vehicle for a connection of a power supply to the main body. The securing means for securing the telephone to the telephone cradle includes a set of opposite extruding arms positioned on the main body substantially adjacent to the top receiving end of the telephone cradle and a seat for receiving the telephone positioned on the main body substantially adjacent to the receiving end of the telephone cradle. In an alternative embodiment, the speaker is positioned on the back of the main body and in all embodiments, an extension member may be included.

25 Claims, 9 Drawing Sheets

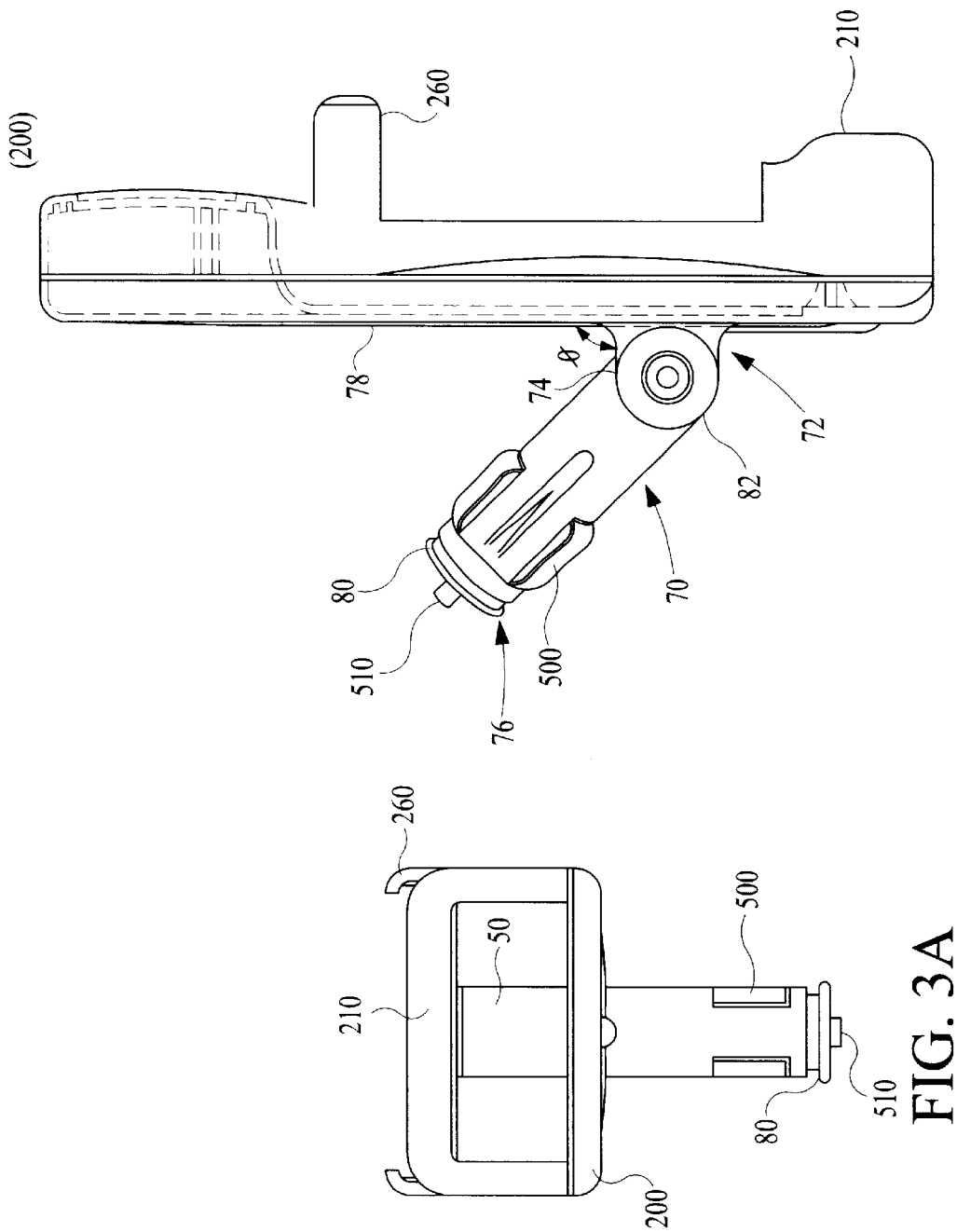

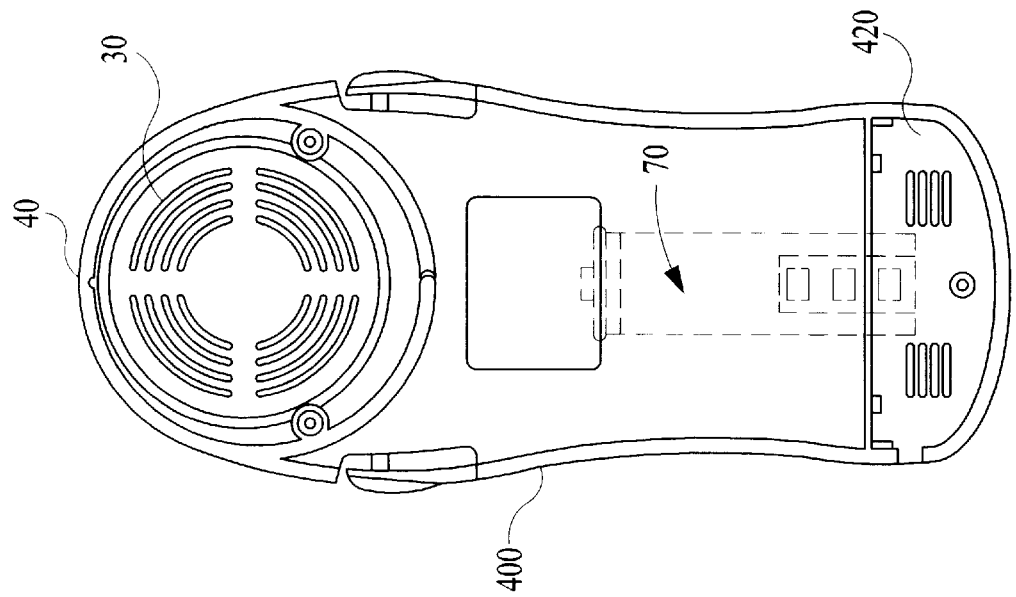
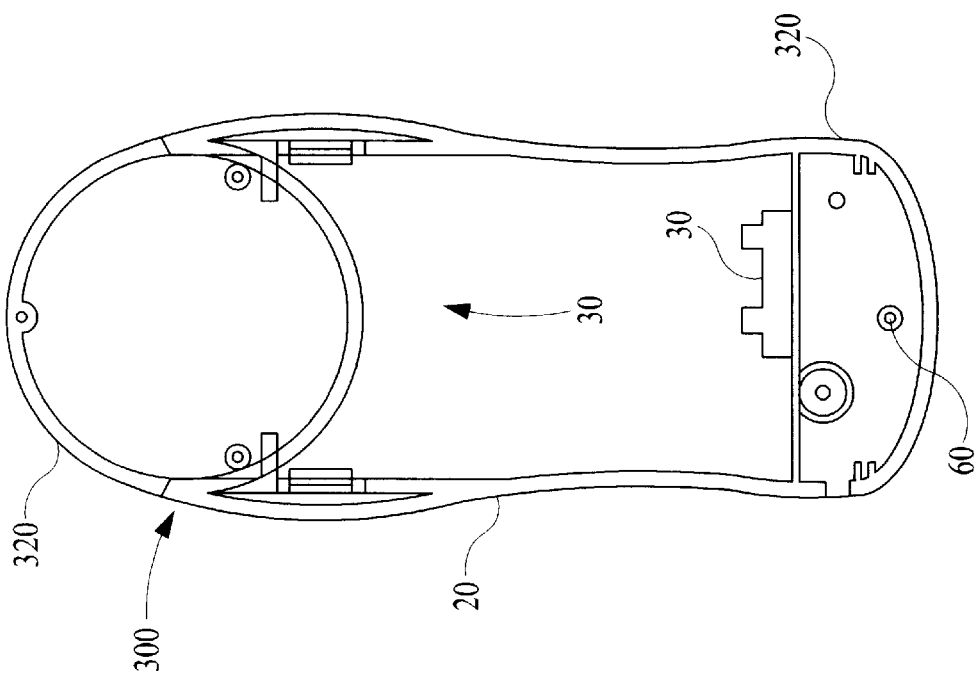

DEVICE FOR SAFE USE OF A PORTABLE CELLULAR TELEPHONE WHILE DRIVING

FIELD OF THE INVENTION

This invention relates generally to the cellular telephone industry, and this invention relates in particular to a device for permitting the hands-free use of a cellular telephone while driving a vehicle.

BACKGROUND OF THE INVENTION

Conventional cellular telephones have become extremely popular and indispensable communication tools for people who are constantly "on the go". While technology exists to permanently mount cellular telephones in vehicles, permitting users to utilize such devices while driving, most cellular telephone users use them, or at least need access to them, in locations other than their vehicles. Thus, the cellular telephone of choice to most users is a "portable" cellular telephone. Portable cellular telephones are primarily battery-operated, although technology exists to operate the telephone and/or charge the telephone's battery by connecting the telephone and battery to a power supply, such as a vehicle's cigarette lighter.

In the setting of a vehicle, however, portable cellular telephones are cumbersome, and potentially dangerous, to use. If the telephone is picked up only one hand. Often, in an effort to remain "hands-free", drivers support the telephone between the shoulder and the neck, which positioning tends to increase the possibility of accidents, as the driver's top priority should be operating the vehicle, and the effort to use the cellular telephone in a "hands-free" manner may pose additional dangers to the driver. In fact, certain jurisdictions throughout the world have proposed and/or enacted legislation prohibiting the use of cellular telephones in vehicles, to the extent that such use affects the driver's operation of the vehicle.

One possible manner in which to avoid the dangers of operating a vehicle while using a cellular telephone is to utilize a device which converts the telephone for use in a hands-free, or loudspeaker, environment. When such an accessory is installed in a vehicle and a portable cellular telephone is mounted thereto, it is possible to use a portable cellular telephone in a truly hands-free environment, as the portable telephone's microphone and speaker are linked to the same elements within the hands-free accessory.

Previous efforts to provide a hands-free apparatus for use of a cellular telephone while driving a vehicle are described in U.S. Pat. No. 5,471,530 to Chen ('530 patent); U.S. Pat. No. 5,490,213 to Huang ('213 patent); U.S. Pat. No. 5,613,222 to Guenther ('222 patent); U.S. Pat. No. 5,779,205 to Ching ('205 patent); and U.S. Pat. No. 5,797,088 to Stamegna ('088 patent), each of which is incorporated herein by reference.

The '530 patent describes a rack securing a cellular telephone to a window of an automobile which is adjustable to fit to the mouth of a driver so as to permit a driver of a vehicle to operate a cellular telephone in a hands-free manner. The securing rack includes a mounting base having a vertical portion and a horizontal portion, a clamping board which is adjustably associated with the mounting base and engaged with a speaker and a battery box, and a securing piece removably fixed to a telephone retaining seat having a voice pick-up. A cellular telephone is held by a spring biased clamping member of the retaining seat with the voice pick-up which is electrically connected to the speaker.

The '213 patent describes an apparatus comprising a wireless microphone transmitter, to be disposed in a passenger room of a vehicle, a main terminal with a terminal housing comprising a loudspeaker and one end adapted to be inserted into a cigarette lighter socket, and a telephone connector adapted to be electrically connected to a mobile telephone unit via an electrical cable. adapted to be electrically connected to a mobile telephone unit via an electrical cable.

The '222 patent describes a headset for use with a cellular telephone. The headset comprises an acoustical earpiece assembly, a device for mounting the ear piece assembly on the head, in a position adjacent an ear of a person wearing the headset, and a flexible acoustical receiving tube having an upper end connected to the earpiece and a lower end attached to an acoustical receiving cup. The headset also includes a device for releasably attaching the acoustical receiving cup to a telephone in a position where the mouth of the cup is disposed closely adjacent the telephone speaker for receiving sound emitting from the speaker.

The '205 patent describes an extensible windshield portable holder, capable of firmly attaching to the front windshield and extending to a desired handy position to the driver. The windshield portable holder comprises an extensible holder arrangement, which includes a supporter, a sucking device for firmly attaching to a predetermined position of a windshield, an extending device, and a telephone holder mounted on the supporter and adapted to hold a portable telephone thereon.

The '088 patent describes a vehicular audio/cellular telephone system including a vehicular audio system and cellular telephone. In a first embodiment of this invention, the vehicular audio system includes an AM/FM radio, cassette player, CD player or combinations of these, integrates a detachable cellular telephone including a transceiver, rechargeable battery, and small non-directional antenna. When integrated into the vehicular audio system, the cellular telephone uses the vehicle's power and external antenna.

None of the devices mentioned above describe a cordless apparatus for permitting the hands-free use of a cellular telephone while driving a vehicle which is compact, easy to use, and removably attachable for use in any vehicle.

Consequently, there is a need in the art for a lightweight, easy to install, and cordless apparatus for permitting the hands-free use of a cellular telephone while driving a vehicle.

There is a further need in the art for a cordless apparatus for permitting the hands-free use of a cellular telephone while driving a vehicle which is removably attachable for use in any vehicle.

There is a further need in the art for a cordless apparatus for permitting the hands-free use of a cellular telephone while simultaneously charging the telephone battery, in preparation of using the telephone outside the vehicle.

Finally, there is a need in the art for a unitary lightweight, small and cordless apparatus permitting the hands-free use of a cellular telephone while driving a vehicle, which cannot be visually observed from outside of the vehicle and is aesthetically pleasing to the eye.

SUMMARY OF THE INVENTION

The present invention resolves significant problems in the art by providing a cordless apparatus for permitting the hands-free use of a cellular telephone while driving a vehicle comprising a main body comprising a speaker, a telephone cradle comprising a charging unit, and a microphone, a supporting member comprising a first end affixed to the main body and a second end comprising a cigarette lighter adapter for plugging into a cigarette lighter of the vehicle for a connection of a power supply to the main body, and a securing means for securing said telephone to said telephone cradle. The charging unit comprises a safety mechanism to preclude a cellular telephone battery from over charging, thus causing damage to the cellular telephone battery or cellular telephone. Once the cellular telephone battery is fully charged, the safety mechanism is triggered to prevent further charging of the cellular telephone battery. The securing means comprises a pair of opposite extruding arms affixed to said main body and a seat for receiving the telephone. An extension member having one end removably attached to the second end of the supporting member and an opposite end comprising a cigarette lighter adapter for plugging into a cigarette lighter of the vehicle for a connection of a power supply to the main body, may be optionally used for extending the supporting member of the apparatus.

There are various aspects of the present invention which allows the cordless apparatus to be used with various types and models of cellular telephones, including ERICSSON®, MOTOROLA® and NOKIA®.

An object of this invention is to provide an apparatus for permitting the hands-free use of a cellular telephone while driving a vehicle which is easy to use, lightweight and does not require the use of any cords or exterior cables.

Another object of this invention is to provide an apparatus for permitting the hands-free use of a cellular telephone which is compact and removably attachable to any vehicle.

Another object of this invention is to provide an apparatus permitting the hands-free use of a cellular telephone while driving a vehicle which includes a holding or securing means for securing the telephone to the apparatus, while simultaneously charging the telephone battery.

These and other objects, features, and advantages of the present invention may be better understood and appreciated from the following detailed description of the embodiments thereof, selected for purposes of illustration and shown in the accompanying drawings.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings which illustrate preferred and exemplary embodiments, and wherein:

FIG. 3(a) is a top view of the main body of the first aspect of the cordless apparatus permitting the hands-free use of a cellular telephone while driving a vehicle, in accordance with the present invention.

FIG. 3(b) is a side view of the main body of the first aspect of the cordless apparatus permitting the hands-free use of a cellular telephone while driving a vehicle, in accordance with the present invention.

FIG. 6(a) is a front view of the second aspect of the cordless apparatus (without the NOKIA® telephone) permitting the hands-free apparatus of a cellular telephone while driving, in accordance with the present invention.

FIG. 6(b) is a back view of the second aspect of the cordless apparatus (without the NOKIA® telephone) permitting the hands-free apparatus of a cellular telephone while driving, in accordance with the present invention.

DESCRIPTION OF THE PREFERRED EMBODIMENTS

Figure 1:
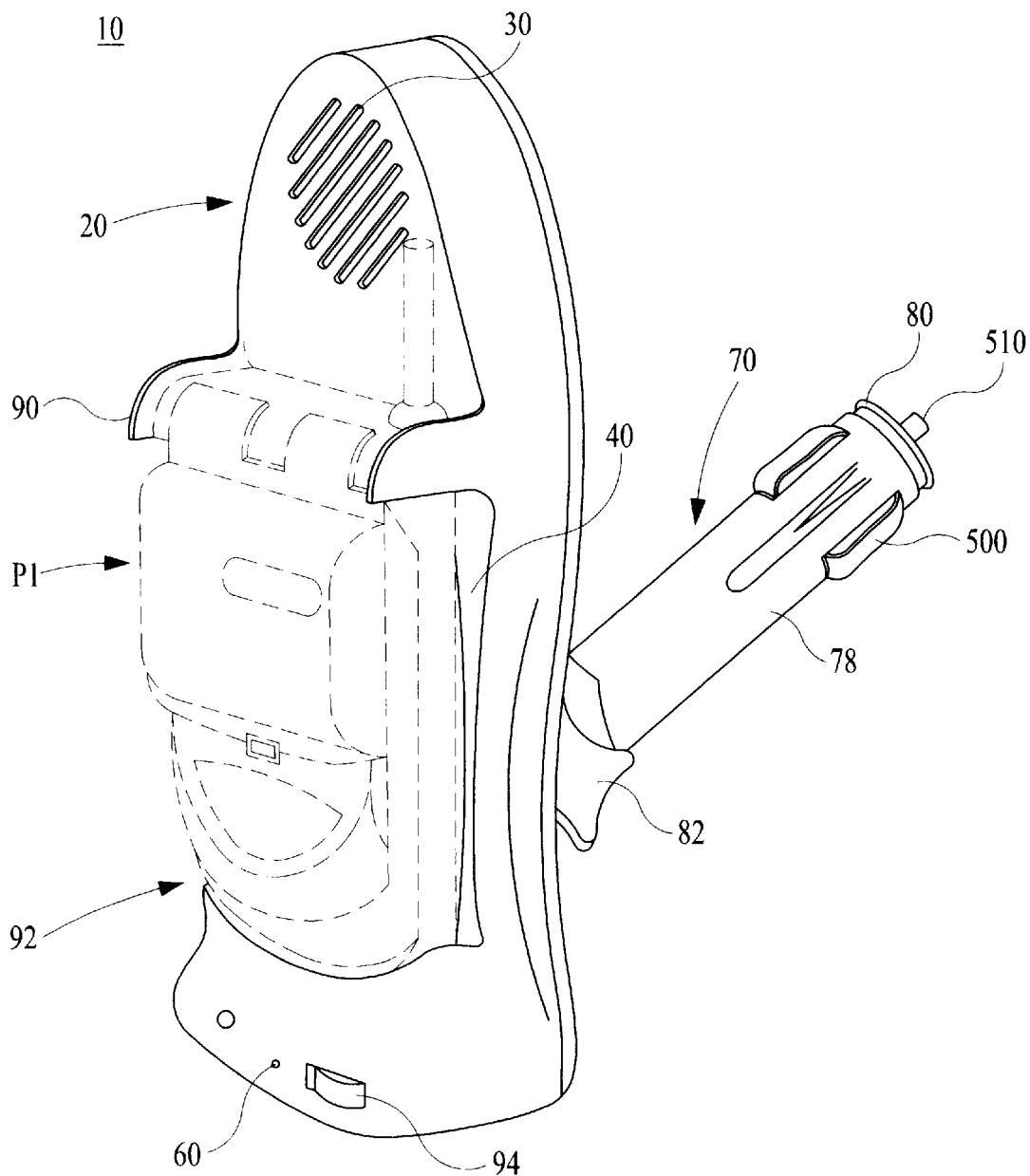
FIG. 1 is a perspective view of a first aspect of the cordless apparatus, for use with a MOTOROLA® StarTac cellular telephone P1, permitting the hands-free use of a cellular telephone while driving a vehicle, in accordance with the present invention.
Figure 2B:
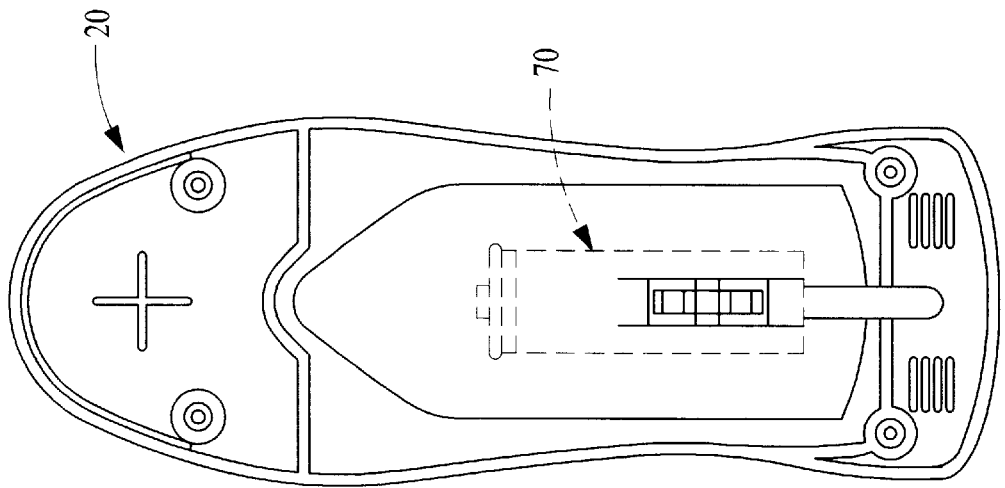
FIG. 2(b) is a back view of the main body of the first aspect of the cordless apparatus permitting the hands-free use of a cellular telephone while driving a vehicle, in accordance with the present invention.
Figure 2A:
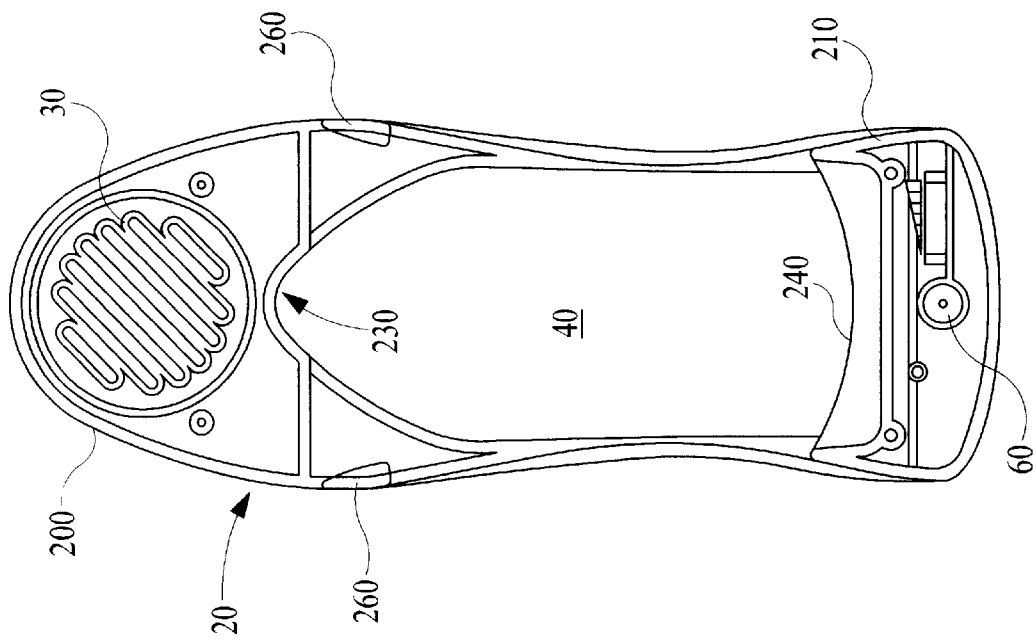
FIG. 2(a) is a front view of the main body of the first aspect of the cordless apparatus permitting the hands-free use of a cellular telephone while driving a vehicle, in accordance with the present invention.

Referring now to the drawings, FIG. 1 illustrates one aspect of a cordless apparatus for permitting the hands free use of a cellular telephone while driving a vehicle, designated generally at 10 which is made in accordance with the present invention. The cordless apparatus has a main body 20 including a speaker 30, a telephone cradle 40 comprising a charging unit 50 (shown in FIG. 3(a)), and a microphone 60, a supporting member 70 attached to the main body of the apparatus and a securing means for securing the telephone to the telephone cradle 40. The securing means for securing the telephone to the telephone cradle comprises a set of opposite extruding arms 90 and a seat 92 for receiving the telephone.

The charging unit 50, comprises a safety mechanism which prohibits a cellular telephone battery to over-charge, causing a blow out or other damage to a cellular telephone. Once the cellular telephone battery is charged, the safety mechanism is activated to prohibit further charging of the cellular telephone battery. The charging current is approximately 500 mAh. The maximum speaker power is approximately 0.5 Watts. The speaker impedance is approximately 16 ohms.

As shown in FIGS. 1 and 3(b), the supporting member 70 comprises a first end 72, a pivot hold 74 affixed to the main body 20 and a second end 76, a tubular housing part 78 comprising a cigarette lighter adapter 80 for plugging into a cigarette lighter of the vehicle for a connection of a power supply (P), approximately, 0.1 W of consumption power, to the main body 20, namely the speaker 30, charging unit 50 and microphone 60. The input voltage is approximately 12–24 Volts DC. The pivot hold 74 of the supporting member 70 comprises an adjustable turning knob 82 for adjusting the angular position (ø) of the tubular housing part 78 between 0 and 180 degrees from the main body 20.

Figure 4:
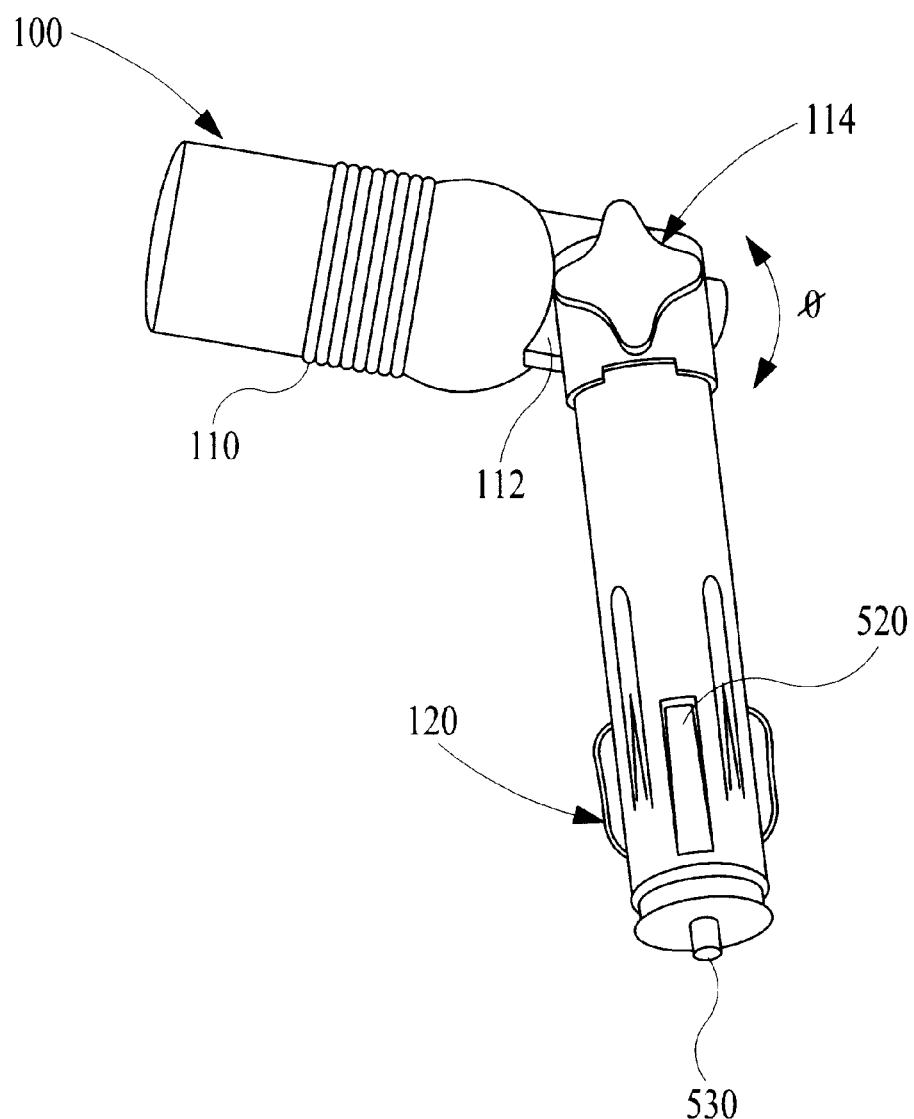
FIG. 4 is a perspective view of the extension member.

As shown in FIG. 4, the present invention includes the optional use of a removably attachable extension member 100, which extension member comprises two members, a socket member 110 and a cigarette lighter adapter member 120 which are attached by a pivot hold 112 which comprises a turning knob 114 for adjusting the angular position (Ø) of the adapter member 120 between 0 and 180 degrees from the socket member 110. The socket member 110 is formed similar to a cigarette lighter socket into which, the second end 76 of the supporting member 70 of the main body 20, the cigarette lighter adapter 80, is plugged into. Thus, the plugging of the second end 76 of the supporting member 70 of the main body 20 into the socket member 110 of the extension member 100, forms a longer and extending supporting unit, for use in vehicles with protruding dashboards or for enabling a user of the apparatus to customize the positioning of the apparatus to suit a user's own personal needs. The adapter member 120 of the extension member 100, is similar to the cigarette lighter adapter 80 of the supporting member 70, as it is for plugging into a cigarette lighter of the vehicle for a connection of a power supply (P) to the main body via the supporting member 70.

As shown in FIGS. 1, and 4, the tubular housing part of the cigarette adapter 78 of the supporting member 70 and the adapter member 120 of the extension member 100 comprise a set of first and a set second electrical contacts 500, 510 and 520, 530, respectively. The first electrical contacts serve to connect electrically the components of the main body 20 to a car battery (B) via the vehicle's cigarette lighter socket, thus permitting the supply of the electric power (P) to the different components of the main body 20. The electrical contacts include a plurality of first electrical contacts formed as a plurality of curved strips that are secured to the tubular housing part of the cigarette adapter 78 and the adapter member 120 of the extension member, 500, 520 and a second electrical contact that is disposed axially in the tubular housing part of the cigarette lighter adapter 78 and the adapter member 120 between the plurality of first electrical contacts 500, 520 and that extends through a tip of the cigarette adapter of the supporting member and adapter member of the extension member, 510, 530, respectively.

Figure 8:
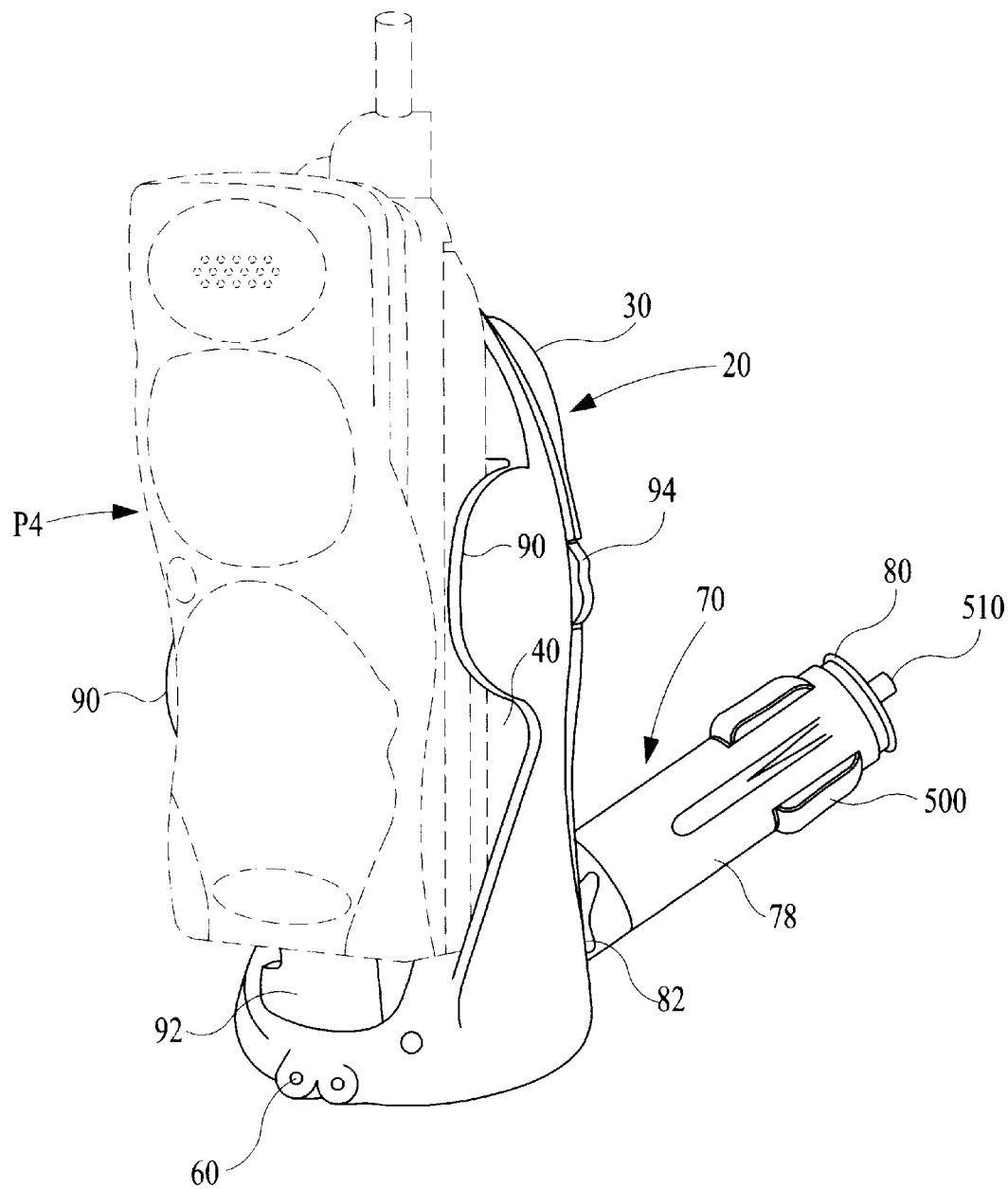
FIG. 8 is a perspective view of a fourth aspect of the cordless apparatus, for use with a MOTOROLA® cellular telephone, permitting the hands-free use of a cellular telephone while driving a vehicle, in accordance with the present invention.
Figure 9:
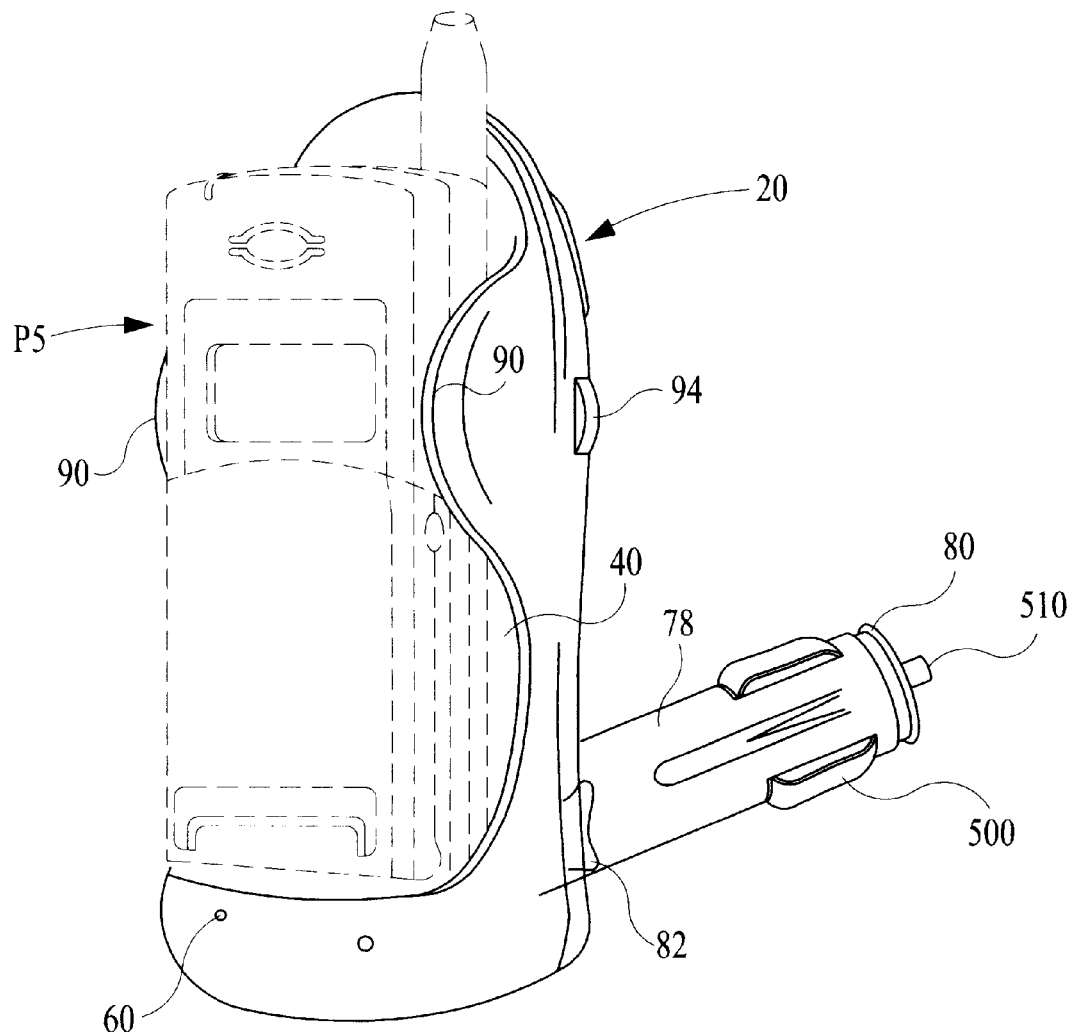
FIG. 9 is a perspective view of a fifth aspect of the cordless apparatus, for use with an ERICSSON® AF778 cellular telephone, permitting the hands-free use of a cellular telephone while driving a vehicle, in accordance with the present invention.

As illustrated in FIGS. 1 and 5–9, the present invention may be used with various models of cellular telephones, including ERICSSON® DF388vi P3 and AF778 P5 (Shown in FIGS. 7 and 9), NOKIA® P2 (Shown in FIG. 5) and MOTOROLA® P1, P4 (shown in FIGS. 1 and 8).

For example, in a first aspect of the present invention, as illustrated in FIGS. 1, 2(a)–(b) and 3(a)–(b), the main body 20 comprises a head 200 and a base 210. The telephone cradle 40 is substantially centrally located within the main body 20, between the head 200 and the base 210 of the main body 20. The telephone cradle 40 comprises a top receiving end 230 and a bottom receiving end 240. In a first aspect of the present invention, for use with, for example a MOTOROLA® StarTac cellular telephone P1 (shown in FIG. 1), the speaker 30 is positioned on the head 200 of the main body 20 substantially adjacent to the top receiving end 230 of the telephone cradle 40. The microphone 60 is located on the base 210 of the main body 20, substantially adjacent to the bottom receiving end 240 of the telephone cradle 40. Additionally, the volume control 94 for the speaker 30 is substantially centrally positioned on the base 210 of the main body 20, substantially adjacent to the top receiving end 230 of the telephone cradle 40. The securing means for securing the telephone to the telephone cradle 40 comprises a pair of opposite arms 260 positioned on the main body 20 substantially adjacent to the top receiving end 230 of the telephone cradle 40 and a seat 92 for receiving the telephone positioned on the main body 20 substantially adjacent to the bottom receiving end 240 of the telephone cradle 40.

Figure 5:
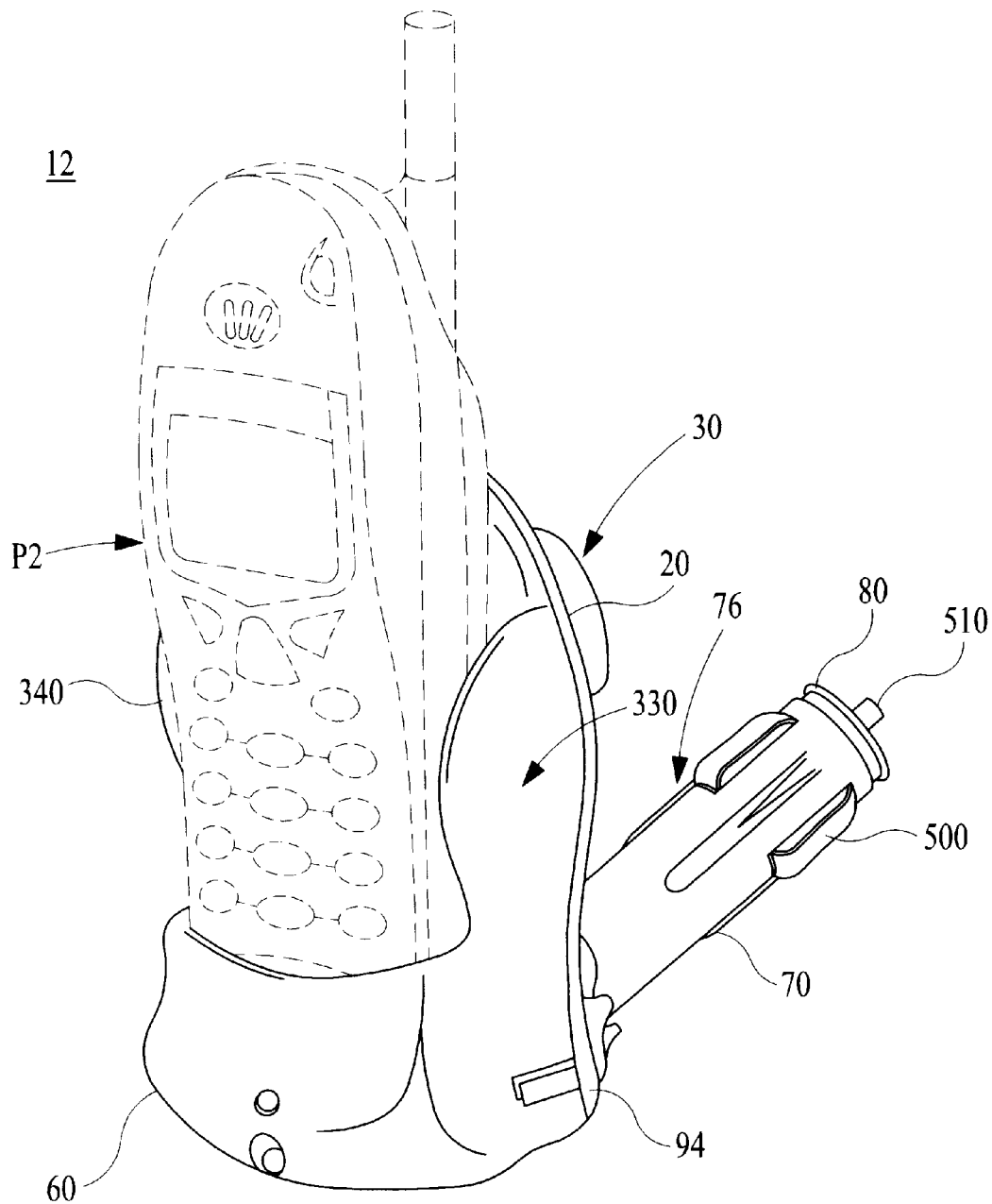
FIG. 5 is a perspective view of a second aspect, for use with a NOKIA® cellular telephone, of the cordless apparatus permitting the hands-free use of a cellular telephone while driving a vehicle, in accordance with the present invention.
Figure 7:
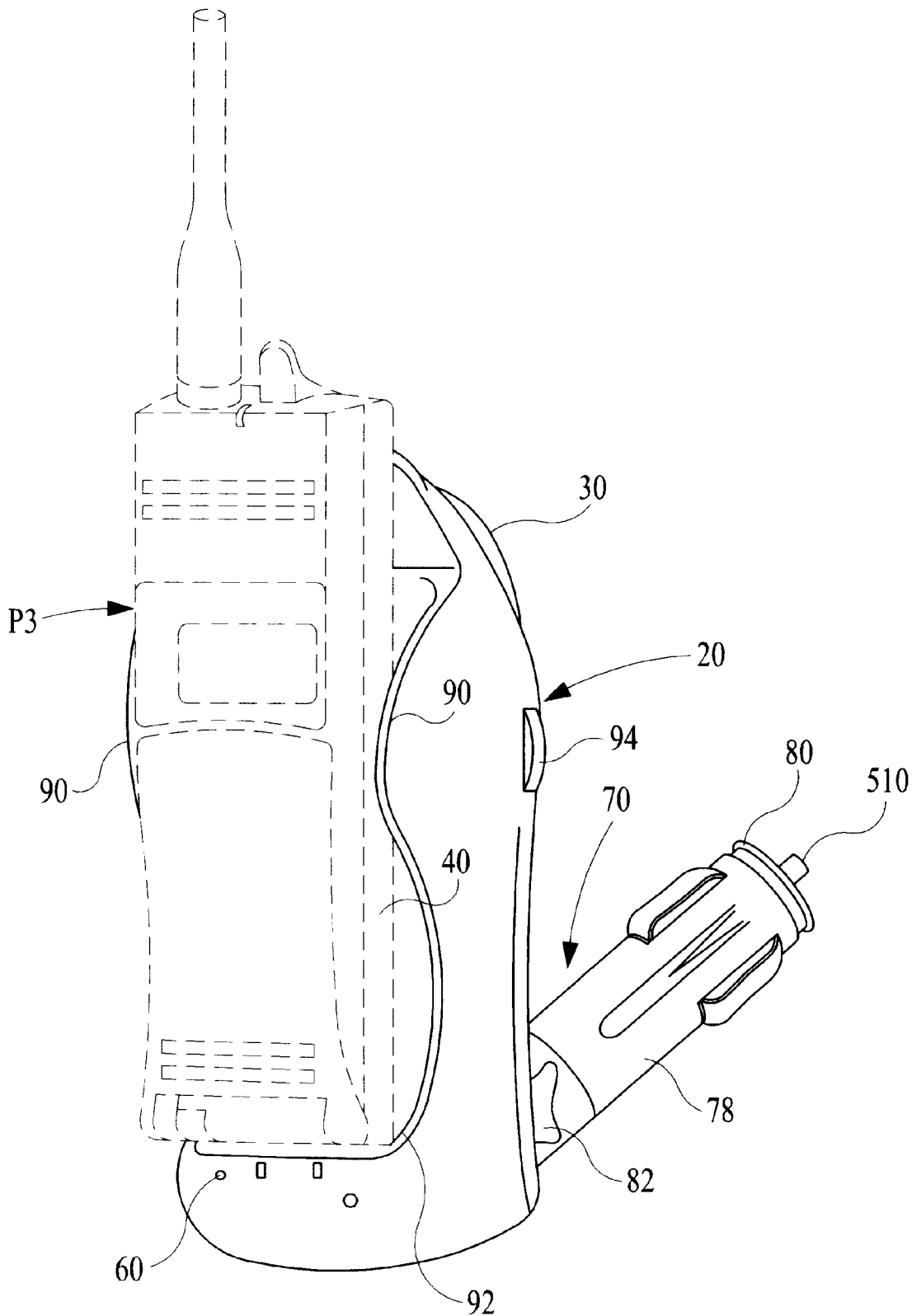
FIG. 7 is a perspective view of a third aspect, for use with an ERICSSON® DF388vi cellular telephone, of the cordless apparatus permitting the hands-free use of a cellular telephone while driving a vehicle, in accordance with the present invention.

Alternatively, in a second aspect of the present invention, as shown in FIGS. 5, 6(a) and 6(b), designated generally as 12, which may be used, for example with a NOKIA® cellular telephone P2, comprises a main body 20 with a front 300, comprising a frontthead 310, and a frontbase 320, and a back 400, comprising a backhead 410 and a backbase 420. The front 300 and back 400 of the main body 20 are attached by a right panel 330 and a left panel 340. The telephone cradle 40 is substantially centrally positioned between the frontthead 310 and the frontbase 320. The speaker 30 is positioned on the back 400 of the main body 20 substantially adjacent to the backhead. The microphone 60 is substantially centrally positioned on the frontbase 320 of the main body 20. The securing means for securing the telephone to the telephone cradle 40 comprises a set of extruding side panels formed by the right and left panels 330, 340 respectively, and a seat 92 for receiving the telephone. The volume control 94 for the speaker 30 is positioned on the right side panel 330 of the main body 20.

Accordingly, it will be understood that the preferred embodiment of the present invention has been disclosed by way of example and that other modifications and alterations may occur to those skilled in the art without departing from the scope and spirit of the appended claims.

I claim:

1. A cordless apparatus for use in a vehicle and for permitting hands-free use of a cellular telephone by a user while the user is driving the vehicle, comprising:

(a) a main body free of visible cords and cables external to said main body, said main body comprising
  (i) a speaker for communicating sound to the user when power from a power supply of the vehicle is supplied to said speaker,
  (ii) a telephone cradle for positioning the cellular telephone thereon,
  (iii) a charging unit for charging a battery connected to the cellular telephone positioned on said telephone cradle when power from the vehicle power supply is supplied to said charging unit, and
  (iv) a microphone into which a user speaks for communicating sound from the user when power from a power supply of the vehicle is supplied to said speaker,
wherein said speaker, charging unit and microphone are integrated components of said main body which do not use any visible cords or cables external to said main body; and (b) a supporting member for supporting both said main body and the cellular telephone when the cellular telephone is positioned on said telephone cradle, said supporting member comprising
  (i) a first end adjustable connected to said main body for customizing the position of said main body, and
  (ii) a second end comprising a lighter adapter for plugging into a lighter socket of the vehicle for connecting said integrated components of said main body to the vehicle power supply to provide power to said integrated components to power said speaker and said microphone of said main body and to charge the battery of the cellular telephone when the cellular telephone connected to the battery is positioned on said telephone cradle, whereby, when the cellular telephone connected to the battery is positioned on said telephone cradle and said lighter adapter is plugged into the lighter socket of the vehicle (1) said supporting member supports both said main body and the cellular telephone, (2) the vehicle power supply provides power to said charging unit of said main body for charging the battery and to said speaker and said microphone of said main body for powering said speaker and said microphone, respectively, and (3) said adjustable connection between said first end and said main body permits adjustment of said main body to a customized position selected by the user, so that the user can operate the cellular telephone without hands at a customized position while driving the vehicle.

2. The cordless apparatus of claim 1, wherein said main body further includes securing means for securing a cellular telephone to said telephone cradle of said main body.

3. The cordless apparatus of claim 2, wherein said microphone is located at said base of said main body, substantially adjacent to said bottom receiving end of said telephone cradle, and said securing means includes a set of opposite extruding arms positioned on said main body substantially adjacent to said top receiving end of said telephone cradle and a seat for receiving a cellular telephone positioned on said main body substantially adjacent to said receiving end of said telephone cradle.

4. The cordless apparatus of claim 2, wherein said securing means for securing the cellular telephone to said telephone cradle of said main body comprises a pair of opposite extruding arms affixed to said main body and a seat for receiving a cellular telephone.

5. The cordless apparatus of claim 1, wherein said cordless apparatus further includes an extension member having one end removably attached to said second end of said supporting member and an opposite end comprising a lighter adapter for plugging into the lighter socket of the vehicle for connecting said integrated components of said main body to the vehicle power supply to supply power to said integrated components to power said speaker and said microphone and to charge the battery connected to the cellular telephone when the cellular telephone connected to the battery is inserted on said telephone cradle of said main body.

6. The cordless apparatus of claim 5, wherein said cordless apparatus further includes a safety mechanism for prohibiting a cellular telephone battery from over-charging when the cellular telephone connected to the cellular telephone battery is located on said telephone cradle of said main body and said lighter adapter is plugged into the lighter socket of the vehicle.

7. The cordless apparatus of claim 1, wherein said main body comprises a head and a base.

8. The cordless apparatus of claim 7, wherein said telephone cradle is substantially centrally located within said main body, between said head and said base, said telephone cradle having a top receiving end and a bottom receiving end.

9. The cordless apparatus of claim 8, wherein said speaker is positioned on said head of said main body substantially adjacent to said top end of said telephone cradle.

10. The cordless apparatus of claim 8, wherein said charging unit is located substantially adjacent to said bottom receiving end of said telephone cradle.

11. The cordless apparatus of claim 8, wherein said microphone is located at said base of said main body, substantially adjacent to said bottom receiving end of said telephone cradle.

12. The cordless apparatus of claim 1, wherein said main body comprises a front and a back, wherein said front includes a fronthead and a frontbase and said back includes a backhead and a backbase.

13. The cordless apparatus of claim 12, wherein said telephone cradle is substantially centrally located within said main body, between said fronthead and said frontbase, said telephone cradle having a top receiving end and a bottom receiving end.

14. The cordless apparatus of claim 13, wherein said speaker is positioned on said back of said main body.

15. The cordless apparatus of claim 13, wherein said charging unit is located substantially adjacent to said bottom receiving end of said telephone cradle.

16. The cordless apparatus of claim 13, wherein said microphone is located on said frontbase of said main body, substantially adjacent to said bottom receiving end of said telephone cradle.

17. The cordless apparatus of claim 16, wherein said main body comprises a front, a fronthead, a frontbase and a back, a backhead and backbase,
   said telephone cradle is substantially centrally located within said main body between said fronthead and said frontbase, said telephone cradle having a top receiving end and a bottom receiving end,
   said speaker is positioned on said back of said main body,
   said charging unit located substantially adjacent to said bottom receiving end of said telephone cradle,
   said microphone is located on said frontbase of said main body, substantially adjacent to said bottom receiving end of said telephone cradle,
   said adjustable securing means includes a set of opposite extruding side panels positioned to said main body substantially adjacent to said top receiving end of said telephone cradle and a seat for receiving the cellular telephone positioned on said main body substantially adjacent to said receiving end of said telephone cradle.

18. The cordless apparatus of claim 1, wherein said cordless apparatus further includes a safety mechanism for prohibiting a cellular telephone battery from over-charging when the cellular telephone connected to the cellular telephone battery is located on said telephone cradle of said main body and said lighter adapter is plugged into the lighter socket of the vehicle.

19. A cordless apparatus for use in a vehicle and for permitting hands-free use of a cellular telephone by a user while the user is driving the vehicle, comprising:
   a main body free of external cords and cables comprising a head and a base;
      a telephone cradle located within said main body between said head and said base, said telephone cradle having a top receiving end and a bottom receiving end,
      a charging unit located substantially adjacent to said bottom receiving end of said telephone cradle to charge a battery connected to the cellular telephone positioned on said telephone cradle,
      a speaker positioned on said head of said main body substantially adjacent to said top end of said telephone cradle, and
      a microphone located on said base of said main body, substantially adjacent to said bottom receiving end of said telephone cradle,
      wherein said speaker, charging unit, and microphone are individual components integrated into said main body which do not require use of any visible cords or cables external to said main body;

a supporting member comprising a first end affixed to said main body and a second end comprising a lighter adapter for plugging into a lighter socket of the vehicle for connecting a power supply to said integrated components of said main body;

securing means for securing the cellular telephone to said telephone cradle when the cellular telephone is positioned on said telephone cradle, wherein said securing means includes a set of opposite extruding arms positioned on said main body substantially adjacent to said top receiving end of said telephone cradle and a seat positioned on said main body substantially adjacent to said receiving end of said telephone cradle for receiving the cellular telephone; and an extension member having a first end in the form of a lighter socket for removably attaching to said second end of said supporting member and an opposite end comprising a lighter adapter for plugging into the lighter socket of the vehicle for connecting a power supply to said integrated components of said main body, whereby, when the cellular telephone to the battery is placed onto said telephone cradle of said main body and said lighter adapter of said extension member is plugged into the lighter socket of the vehicle and said lighter adapter of said second end of said supporting member is inserted into said lighter socket of said extension member, said supporting member and said extension member act in combination to (i) support both said main body and the cellular telephone positioned on said telephone cradle of said main body and (ii) connect power to said integrated components for powering said speaker and said microphone and charging the battery connected to the cellular telephone, so that a cellular telephone located on said telephone cradle can be used by a user while driving the vehicle without use of hands and without use of visible cords and cables external to said main body.

20. The cordless apparatus of claim 19, wherein said supporting member is an adjustable supporting member and said first end is adjustably affixed to said main body for customizing the position of said main body, whereby, when the cellular telephone is inserted into said telephone cradle of said main body and said lighter adapter of said opposite end of said extension member is plugged into the lighter socket of the vehicle, said adjustable supporting member permits adjustment of said main body to a customized position selected by a user, so that the cellular telephone located on said main body can be used at a customized position selected by the user while driving the vehicle without use of hands or visible cords or cables external to said main body.

21. The cordless apparatus of claim 19, wherein said removably attached end of said extension member is adjustably affixed to said second end of said supporting member for customizing the position of said main body by the user of said cordless apparatus, whereby, when said lighter adapter of said opposite end of said extension member is plugged into the lighter socket of the vehicle, said adjustable extension member permits adjustment of said main body to a customized position selected by the user, so that the cellular telephone located on said main body can be used by the user at a customized position selected by the user while driving the vehicle without use of hands and without use of any visible cords or cables external to said main body.

22. The cordless apparatus of claim 19, wherein said first end of said supporting member is adjustably affixed to said main body and said removably attached end of said extension member is adjustably affixed to said second end of said supporting member for customizing the position of said main body by the user of said cordless apparatus, whereby, when the cellular telephone is inserted into said telephone cradle of said main body and said lighter adapter of said opposite end of said extension member is plugged into the lighter socket of the vehicle, said adjustable connection between said first end of said supporting member and said body, and said adjustable extension member permits adjustment of said main body to a customized position selected by the user, so that the cellular telephone located on said main body can be supported and can be used at a customized position selected by the user while driving without use of hands or any visible cords or cables external to said main body.

23. The cordless apparatus of claim 19, wherein said cordless apparatus further includes a safety mechanism for prohibiting a cellular telephone battery from over-charging when the cellular telephone connected to the cellular telephone battery is located on said telephone cradle of said main body and said lighter adapter is plugged into the lighter socket of the vehicle.

24. A cordless apparatus for permitting hands-free use of a cellular telephone by user while the user is driving a vehicle, comprising:

a main body having no visible cords and cables external to said main body comprising a front, a fronthead, a frontbase, a back, a backhead and backbase, a telephone cradle substantially centrally located within said main body, between said fronthead and said frontbase, said telephone cradle having a top receiving end and a bottom receiving end, a charging unit, wherein said charging unit is located substantially adjacent to said bottom receiving end of said telephone cradle;

a speaker positioned on said back of said main body substantially adjacent to said backhead, a microphone located at said frontbase of said main body, substantially adjacent to said receiving end of said telephone cradle, wherein said speaker, charging unit, and microphone are individual components which are integrated into said main body without use of any visible cords or wires external to said main body;

a supporting member comprising a first end affixed to said main body and a second end comprising a lighter adapter for plugging into a lighter socket of the vehicle for connecting a power supply to said integrated components of said main body;

securing means for securing the cellular telephone to said telephone cradle, wherein said securing means includes a set of opposite extruding side panels positioned on said main body substantially adjacent to said top receiving end of said telephone cradle and a seat positioned on said main body substantially adjacent to said receiving end of said telephone cradle for receiving the cellular telephone; and an extension member having one end removably attached to said second end of said supporting member and an opposite end comprising a lighter adapter, said lighter adapter for plugging into a lighter socket of the vehicle for a connecting a power supply to said integrated components of said main body.

25. The cordless apparatus of claim 24, wherein said cordless apparatus further includes a safety mechanism for prohibiting a cellular telephone battery from over-charging when the cellular telephone connected to the cellular telephone battery is located on said telephone cradle of said main body and said lighter adapter is plugged into the lighter socket of the vehicle.

* * * * *